(12) United States Patent
Cordova et al.

(10) Patent No.: US 11,833,963 B2
(45) Date of Patent: *Dec. 5, 2023

(54) DEVICE-BASED SYSTEMS AND METHODS FOR DETECTING SCREEN STATE AND DEVICE MOVEMENT

(71) Applicant: Cambridge Mobile Telematics Inc., Cambridge, MA (US)

(72) Inventors: Brad Cordova, Cambridge, MA (US); Rafi Finegold, Sharon, MA (US); Dan Shiebler, Boston, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,010

(22) Filed: Apr. 26, 2022

(65) Prior Publication Data
US 2022/0324381 A1 Oct. 13, 2022

Related U.S. Application Data

(63) Continuation of application No. 16/249,164, filed on Jan. 16, 2019, now Pat. No. 11,338,733, which is a
(Continued)

(51) Int. Cl.
*G08B 21/00* (2006.01)
*B60Q 9/00* (2006.01)
(Continued)

(52) U.S. Cl.
CPC ............... *B60Q 9/00* (2013.01); *G06N 5/04* (2013.01); *G06N 20/00* (2019.01)

(58) Field of Classification Search
CPC .. B60Q 9/00; G06N 5/04; G06N 20/00; G06N 5/046
(Continued)

(56) References Cited

U.S. PATENT DOCUMENTS 9,654,932 B1 5/2017 Mukhtar et al.
10,214,144 B2 2/2019 Cordova et al.
(Continued)

OTHER PUBLICATIONS

U.S. Appl. No. 15/942,212, "Notice of Allowability", dated Oct. 24, 2018, 4 pages.
(Continued)

*Primary Examiner* — Mark S Rushing
(74) *Attorney, Agent, or Firm* — Kilpatrick Townsend & Stockton LLP

(57) ABSTRACT

A method for determining usage of a mobile device in a vehicle by a user includes receiving a first value indicating an "off" state of a screen of the mobile device at a first time, obtaining first movement measurements, and computing a gravity diff angle (GDA) value for the first movements. The method also includes determining that the GDA value exceeds a predefined GDA threshold value, computing summary statistics for the first movements, and classifying the summary statistics as corresponding to mobile device usage starting. The method further includes classifying the first movements of the mobile device as usage movements in response to determining that the GDA value exceeds the predefined GDA threshold, classifying the summary statistics as corresponding to mobile device usage starting, or both, and generating an indication of mobile device usage in response to classifying the first movements of the mobile device as usage movements.

18 Claims, 13 Drawing Sheets

Related U.S. Application Data continuation of application No. 15/942,212, filed on Mar. 30, 2018, now Pat. No. 10,214,144.

(60) Provisional application No. 62/482,049, filed on Apr. 5, 2017.

(51) Int. Cl.
  *G06N 20/00* (2019.01)
  *G06N 5/04* (2023.01)

(58) Field of Classification Search
  USPC ......................................................... 340/439
  See application file for complete search history.

(56) References Cited

U.S. PATENT DOCUMENTS

| | | |
|---|---|---|
| 2005/0210417 A1 | 9/2005 | Marvit et al. |
| 2008/0048980 A1* | 2/2008 | Love ................. G06F 3/0346 345/158 |
| 2010/0191356 A1* | 7/2010 | Wehrenberg ........... G06F 3/162 702/141 |
| 2015/0362998 A1 | 12/2015 | Park et al. |
| 2016/0006861 A1 | 1/2016 | Hodges et al. |
| 2016/0335556 A1* | 11/2016 | Teraoka ................ G06N 20/00 |
| 2017/0187866 A1 | 6/2017 | Li |

OTHER PUBLICATIONS

U.S. Appl. No. 15/942,212, "Notice of Allowance", dated Oct. 17, 2018, 8 pages.
U.S. Appl. No. 16/249,164, "Final Office Action", dated Oct. 20, 2021, 13 pages.
U.S. Appl. No. 16/249,164, "Non-Final Office Action", dated Dec. 17, 2020, 15 pages.
U.S. Appl. No. 16/249,164, "Notice of Allowance", dated Jan. 28, 2022, 10 pages.

* cited by examiner

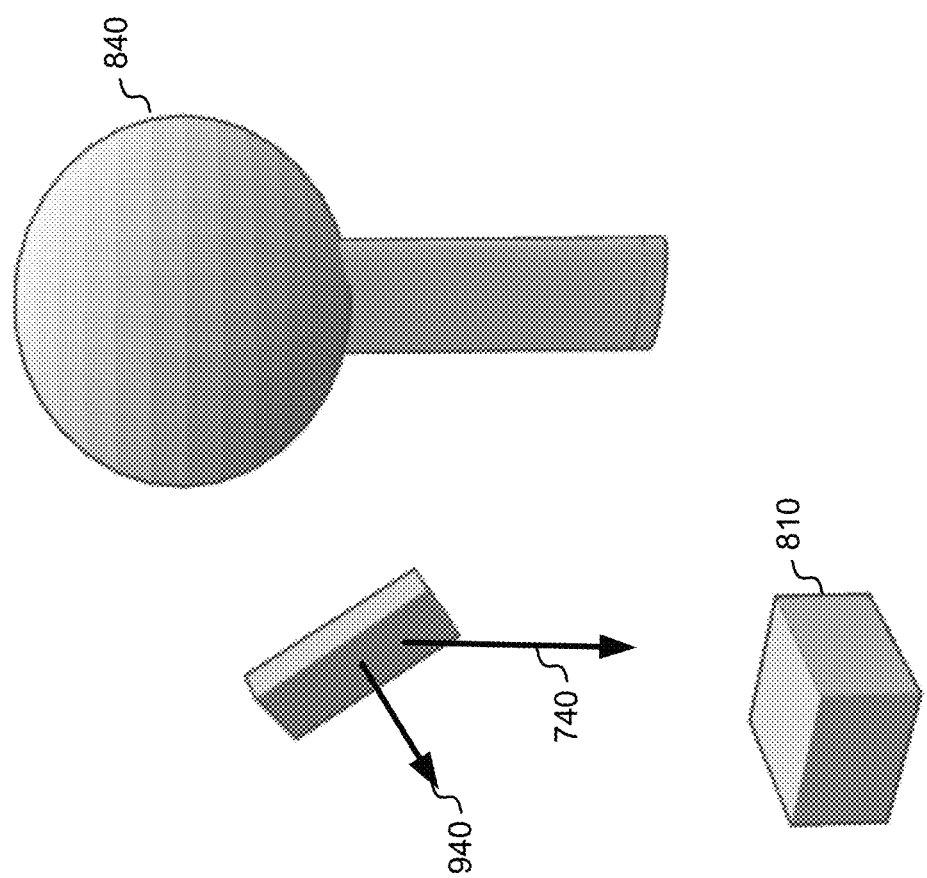

DEVICE-BASED SYSTEMS AND METHODS FOR DETECTING SCREEN STATE AND DEVICE MOVEMENT

CROSS-REFERENCES TO RELATED APPLICATIONS

This application is a continuation of U.S. patent application Ser. No. 16/249,164, filed Jan. 16, 2019; which is a continuation of U.S. patent application Ser. No. 15/942,212, filed Mar. 30, 2018, now U.S. Pat. No. 10,214,144 issued on Feb. 26, 2019; which claims the benefit of U.S. Provisional Patent Application No. 62/482,049, filed on Apr. 5, 2017, the contents of which are hereby incorporated by reference in their entireties.

BACKGROUND OF THE INVENTION

Driving behavior has been a topic of interest. Some systems have been developed to track driving behaviors including speed, braking, and turn speed. External devices have been integrated with vehicles to track driving behavior. One additional driving behavior that is of interest is a driver's inattention to tasks that are important to driving. One source of driver inattention is the use of a mobile device.

Despite the progress made in relation to collecting data related to drivers and their driving behavior, there is a need in the art for improved methods and systems related to tracking and evaluating the inattention of drivers due to device usage.

SUMMARY OF THE INVENTION

Provided are methods, including computer-implemented methods, devices including mobile devices, and computer-program products for detecting device usage.

Embodiments of the present invention utilize mobile devices to provide information on a user's behaviors during transportation. For example, a mobile device carried by a user can be used to determine usage of the device during a drive. The mobile device can further be used to track interaction with the device during a drive.

According to an embodiment of the present invention, a method for determining usage of a device in a vehicle by a user is provided. The method includes querying an operating system of the device using an application programming interface (API) call for a first screen state of the device at a first time and receiving a first value corresponding to the first screen state of the device at the first time. The first screen state is on or off. When the first screen state is on, the method includes generating a device usage indicator in a positive state. When the first screen state is off, the method includes receiving first movements of the device measured by at least one sensor of the device, classifying the first movements of the device as usage movements or non-usage movements based on characteristics of the first movements of the device. The usage movements are indicative of usage of the device by the user. The non-usage movements are indicative of a lack of usage of the device by the user. When the first movements of the device are classified as usage movements, the method includes generating the device usage indicator in the positive state. When the first movements of the device are classified as non-usage movements, the method includes generating the device usage indicator in a negative state.

In response to generating the device usage indicator in the positive state, the method includes querying the operating system of the device using the API call for a second screen state of the device at a second time after the first time and receiving a second value corresponding to the second screen state of the device at the second time. The second screen state is on or off. When the second screen state is off, the method includes modifying the device usage indicator to the negative state. When the second screen state is on, the method includes receiving second movements of the device measured by at least one sensor of the device and classifying the second movements of the device as usage movements or non-usage movements based on characteristics of the second movements of the device. When the second movements of the device are classified as usage movements, the method includes maintaining the device usage indicator in the positive state and when the second movements of the device are classified as non-usage movements, the method includes modifying the device usage indicator to the negative state.

According to another embodiment of the present invention, a device is provided. The device includes a memory and a processor coupled to the memory. The processor is configured to perform operations including querying an operating system of the device using an application programming interface (API) call for a first screen state of the device at a first time and receiving a first value corresponding to the first screen state of the device at the first time. The first screen state is on or off. When the first screen state is on, the processor generates a device usage indicator in a positive state. When the first screen state is off, the processor receives first movements of the device measured by at least one sensor of the device and classifies the first movements of the device as usage movements or non-usage movements based on characteristics of the first movements of the device. The usage movements are indicative of usage of the device by the user and the non-usage movements are indicative of a lack of usage of the device by the user. When the first movements of the device are classified as usage movements, the processor generates the device usage indicator in the positive state. When the first movements of the device are classified as non-usage movements, the processor generates the device usage indicator in a negative state.

In response to generating the device usage indicator in the positive state, the processor queries the operating system of the device using the API call for a second screen state of the device at a second time after the first time. The processor receives a second value corresponding to the second screen state of the device at the second time. The second screen state is on or off. When the second screen state is off, the processor modifies the device usage indicator to the negative state. When the second screen state is on, the processor receives second movements of the device measured by at least one sensor of the device and classifies the second movements of the device as usage movements or non-usage movements based on characteristics of the second movements of the device. When the second movements of the device are classified as usage movements, the processor maintains the device usage indicator in the positive state. When the second movements of the device are classified as non-usage movements, the processor modifies the device usage indicator to the negative state.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 13 is another simplified diagram of a driver and a mobile device held up toward the driver for viewing and touch interface interaction according to some embodiments of the invention.

Figure 1:
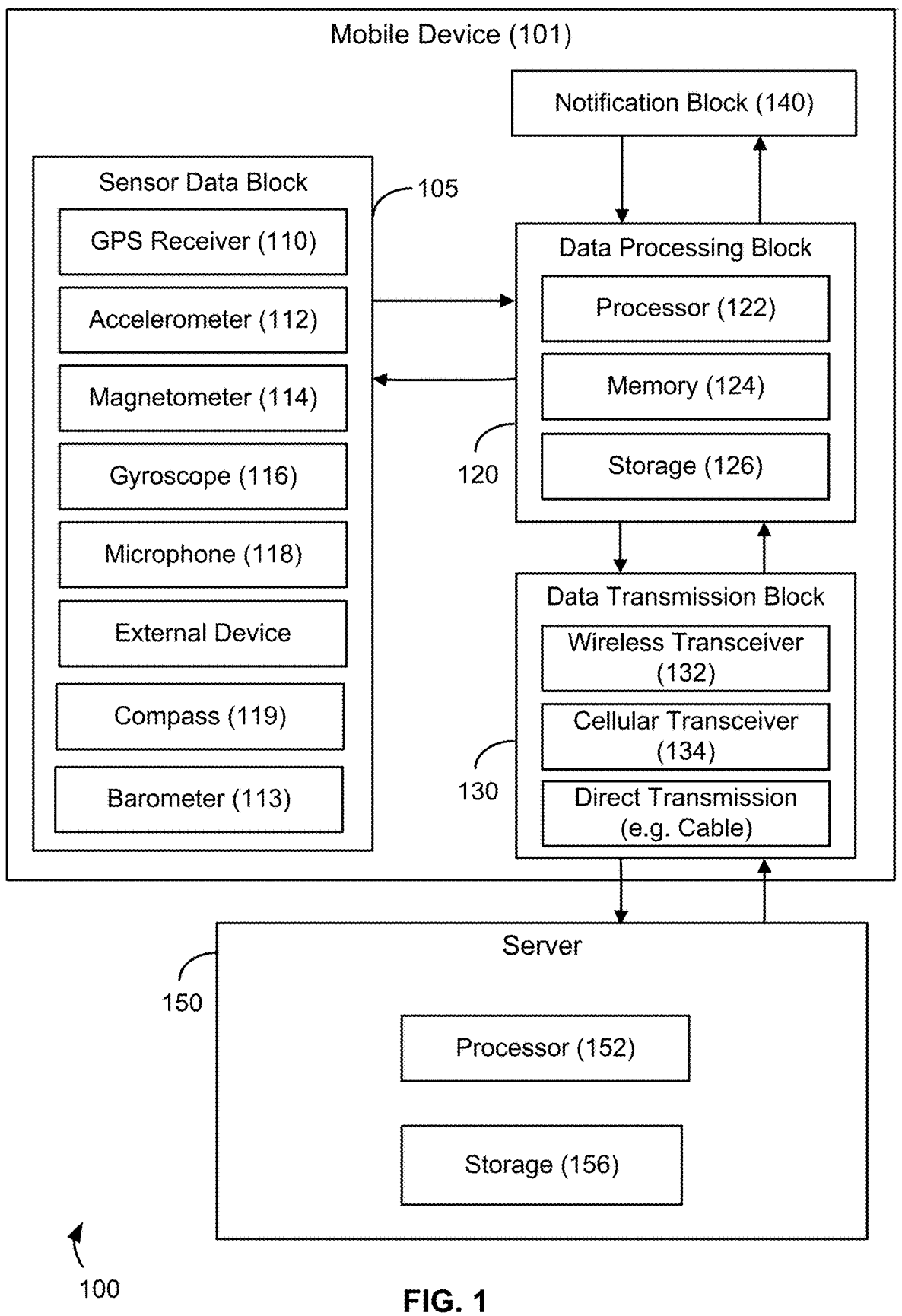
FIG. 1 is a system diagram illustrating a device usage detection system including a mobile device according to some embodiments of the invention.

In the appended figures, similar components and/or features can have the same reference label. Further, various components of the same type can be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Embodiments of the present invention utilize mobile devices to provide information on a user's behaviors during transportation. For example, a mobile device carried by a user could be used to analyze driving behavior. Important driving behaviors that can be identified by some embodiments are device usage behavior and device interaction or touch behavior, which is indicative of distraction or inattentiveness to one or more driving tasks.

FIG. 1 is a system diagram illustrating a system 100 for collecting driving data according to some embodiments of the invention. System 100 includes a mobile device 101 having a number of different components. Mobile device 101 includes a sensor data block 105, a data processing block 120, a data transmission block 130, and a notification block 140. The sensor data block 105 includes data collection sensors as well as data collected from these sensors that are available to mobile device 101. This can include external devices connected via Bluetooth, USB cable, etc. The data processing block 120 includes storage 126, and manipulations done to the data obtained from the sensor data block 105 by processor 122. This includes, but is not limited to, analyzing, classifying, characterizing, subsampling, filtering, reformatting, etc. Data transmission block 130 includes any transmission of the data off the phone to an external computing device that can also store and manipulate the data obtained from sensor data block 105. The external computing device can be, for example, a server 150. Server 150 can comprise its own processor 152 and storage 156. In one embodiment, notification block 140 reports the results of analysis of sensor data performed by the data processing block 120 to a user of the mobile device 101 via a display (not shown). The functions of notification block 140 are described further in U.S. patent application Ser. No. 15/413,005, filed on Jan. 23, 2017, published as U.S. Patent Application Publication No. 2017/0210290, which is hereby incorporated by reference in its entirety.

Some embodiments of the present invention are described using examples where driving data is collected using mobile devices 101, and these examples are not limited to any particular mobile device. As examples, a variety of mobile devices including sensors such as accelerometers 112, gyroscopes 116, magnetometers 114, microphones 118, compasses 119, barometers 113, location determination systems such as global positioning system (GPS) receivers 110, communications capabilities, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 101 (e.g., the sensors of sensor data block 105) are operated close in time to a period when mobile device 101 is with a driver when operating a vehicle—also termed herein "a drive" or "a trip". With many mobile devices 101, the sensors used to collect data are components of the mobile device 101, and use power resources available to mobile device 101 components, e.g., mobile device battery power and/or a power source external to mobile device 101.

Some embodiments use settings of a mobile device to enable different functions described herein. For example, in Apple IOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. For some embodiments, the operating system of mobile device 101 can enable reporting of the screen state of mobile device 101 (i.e., whether the screen is on or off at a particular point in time), as described further herein.

Figure 2:
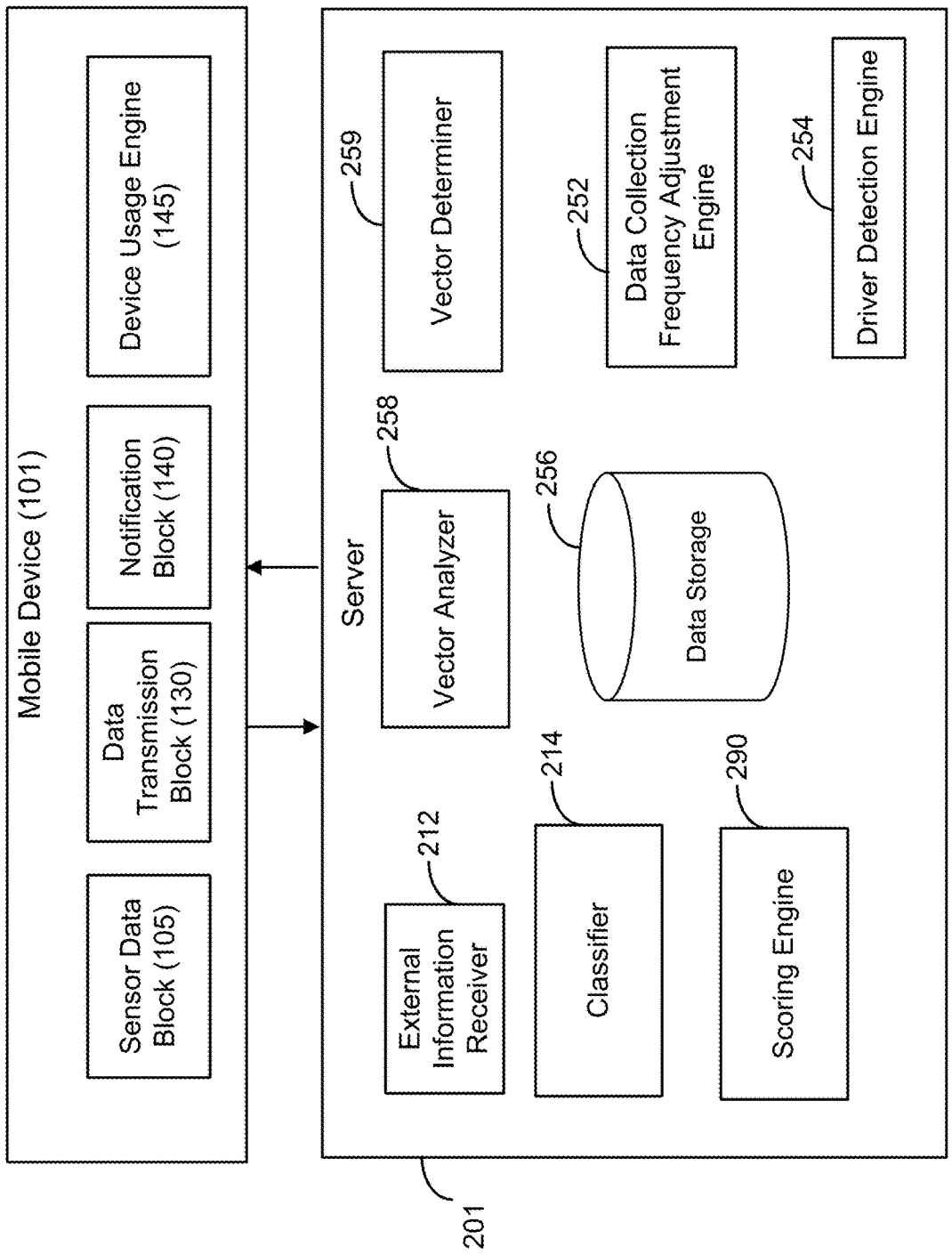
FIG. 2 is a system diagram illustrating a device usage detection system including a server according to some embodiments of the invention.

FIG. 2 shows a system 200 for collecting driving data that can include a server 201 that communicates with mobile device 101. In some embodiments, server 201 provides functionality using components including, but not limited to vector analyzer 258, vector determiner 259, external information receiver 212, classifier 214, data collection frequency engine 252, driver detection engine 254, and scoring engine 290. These components are executed by processors (not shown) in conjunction with memory (not shown). Server 201 also includes data storage 256. It is important to note that, while not shown, one or more of the components shown operating within server 201 can operate fully or partially within mobile device 101. For example, classifier 214 may be located within mobile device 101 in some embodiments.

To collect data associated with the driving behavior of a driver, one or more sensors on mobile device 101 (e.g., the sensors of sensor data block 105) are operated close in time to a period when mobile device 101 is with the driver when operating a vehicle—also termed herein "a drive" or "a trip". Once the mobile device sensors have collected data (and/or in real time), some embodiments analyze the data to determine acceleration vectors for the vehicle, as well as different features of the drive. Examples of processes to detect and classify driving features using classifier 214, and determine acceleration vectors using vector analyzer 258 and vector determiner 259. In some embodiments, external data (e.g., weather) can be retrieved and correlated with collected driving data.

The mobile device 101 may include a sensor data block 105, a data transmission block 130, a notification block 140, and a device usage engine 145. As discussed herein, some embodiments can transform collected sensor data (e.g., driving data collected using sensor data block 105) into different results, including, but not limited to, estimates of the occurrence of times where a driver was using the device. Such functions may be performed by device usage engine 145, for example. Examples of collecting driving data using sensors of a mobile device are described herein. Examples of analyzing collected driving data to detect the occurrence of device usage are also described herein. Notifications of driving events can be made via notification block 140 of mobile device 101 in some embodiments.

As discussed further in U.S. patent application Ser. No. 15/413,005 and U.S. patent application Ser. No. 15/615,579, filed on Jun. 6, 2017, published as U.S. Patent Application Publication No. 2017/0349182, which are hereby incorporated by reference in their entireties, some embodiments analyze collected driving data and assign scores based on different criteria. Some embodiments use scoring engine 290 to analyze relevant data and rules, and generate scores for embodiments.

Although shown and described as being contained within server 201, it is contemplated that any or all of the components of server 201 may instead be implemented within mobile device 101, and vice versa. It is further contemplated that any or all of the functionalities described herein may be performed during a drive, in real time, or after a drive.

Figure 3:
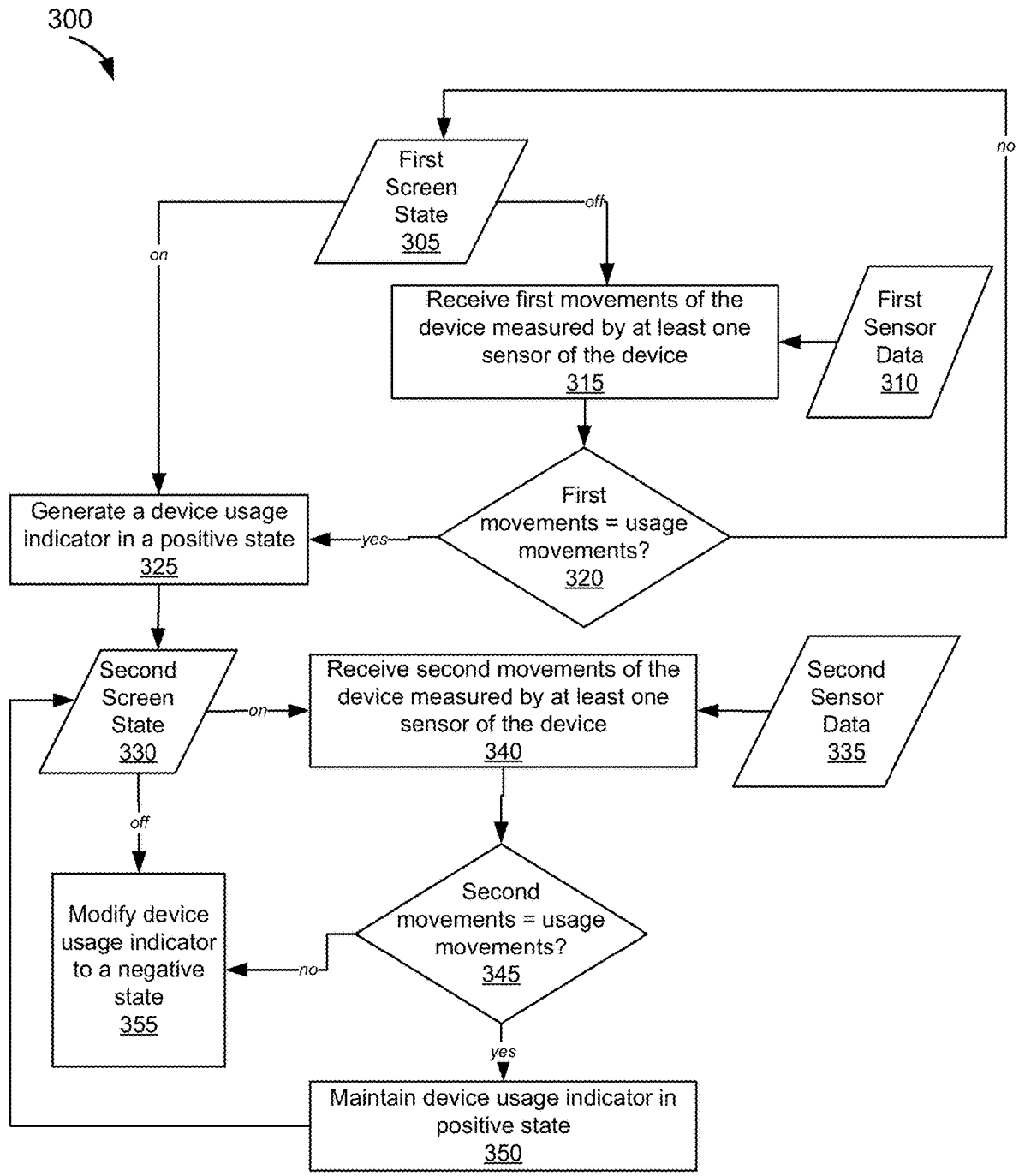
FIG. 3 is a flowchart illustrating a device usage detection method according to some embodiments of the invention.

FIG. 3 is a flowchart 300 illustrating a device usage detection method according to some embodiments of the invention. The method may be performed by mobile device 101 and/or server 150 of FIG. 1, and/or mobile device 101 and/or server 201 of FIG. 2. The method may be performed fully in one device or across multiple devices.

According to FIG. 3, a first screen state 305 may be collected at a first time from mobile device 101. The first time may be at any point before, during, or after a drive. The first screen state 305 may be determined by an operating system of mobile device 101, and may indicate whether the screen of mobile device 101 is on or off at a given point in time. For example, an operating system of mobile device 101 may be queried using an application programming interface (API) call for the first screen state of the device at the first time. A first value corresponding to the first screen state of the device at the first time may be received. The first screen state may be on or off.

When the first screen state 305 is on, a device usage indicator may be generated in a positive state at process block 325. For example, the device usage indicator may be a flag associated with a device usage field that is stored in a database. The device usage indicator may be stored in association with a timestamp at which the device usage indicator was first generated in a positive state.

When the first screen state 305 is off, further processing may be performed to determine whether the mobile device 101 is being used. For example, although the first screen state 305 may be reported as being off, the device may still be handled by a user in a manner that is considered distracting to driving. Further, it is contemplated that the first screen state 305 as reported by the operating system may not always be accurate.

Thus, at process block 315, when the first screen state 305 is off, first movements of the mobile device 101 may be received that were measured by at least one sensor of the mobile device 101. As shown in FIG. 3, the first sensor data 310 may be collected and correlated to movements of the mobile device 101. First sensor data 310 may include any data collected by sensor data block 105 of mobile device 101, such as, for example, gyroscope data, magnetometer data, accelerometer data, global positioning system (GPS) data, and/or the like.

At decision block 320, it is determined whether the first movements are usage movements. For example, a classifier may classify the first movements of the mobile device 101 as usage movements or non-usage movements based on characteristics of the first movements of the mobile device 101. The usage movements may be indicative of usage of the device by the user. The non-usage movements may be indicative of a lack of usage of the device by the user.

If the first movements are not classified as usage movements, the method may go back and monitor the first screen state 305, for example, for a change in state. In some embodiments, if the first movements are not classified as usage movements, a device usage indicator is generated in a negative state. If the first movements are classified as usage movements, a device usage indicator is generated in a positive state. For example, a value of "1" may be associated with a positive device usage indicator, while a value of "0" may be associated with a negative device usage indicator.

Once the device usage indicator is in a positive state, the screen state of the mobile device 101 and/or the movements of mobile device 101 may be monitored to determine whether the device usage is continuing and/or when the device usage ends. A second screen state 330 may be collected. For example, the operating system of the device may be queried using the API call for the second screen state 330 at a second time after the first time. A second value corresponding to the second screen state 330 of the mobile device 101 may be received at the second time. The second screen state 330 may be on or off. When the second screen state 330 is off, the device usage indicator may be modified to a negative state at process block 355. For example, a value associated with the device usage indicator may be changed from "1" to "0".

When the second screen state 330 is on, further processing may be performed to determine whether the device is being used. It is contemplated that there are situations in which the screen of the mobile device 101 is on, even though mobile device 101 is not being used. For example, receiving a phone call, text message or e-mail may turn the screen of mobile device 101 on, but this may not be indicative of the user of the mobile device 101 picking up the mobile device 101 or otherwise interacting with the mobile device 101. The user may simply ignore the notification received on the mobile device 101.

Thus, in some embodiments, when the second screen state 330 is on, second movements of the device measured by at least one sensor of the device may be received at process block 340. As shown in FIG. 3, the second sensor data 335 may be collected and correlated to movements of the mobile device 101. Second sensor data 335 may include any data collected by sensor data block 105 of mobile device 101, such as, for example, gyroscope data, accelerometer data, magnetometer data, global positioning system (GPS) data, and/or the like. The first sensor data 310 and the second sensor data 335 may be collected by the same or different sensors, or, in the case of a plurality of sensors collecting data, some same and some different sensors.

At decision block 345, it is determined whether the second movements are usage movements. For example, a classifier may classify the second movements of the mobile device 101 as usage movements or non-usage movements based on characteristics of the second movements of the mobile device 101. The usage movements may be indicative of usage of the device by the user. The non-usage movements may be indicative of a lack of usage of the device by the user.

If the second movements are not classified as usage movements, the device usage indicator may be modified to a negative state at process block 355. For example, a value associated with the device usage indicator may be changed from "1" to "0". When the device usage indicator is modified to the negative state, a timestamp may be stored indicating the time of the modification, such that a time period of usage may be calculated from a first timestamp associated with the device usage indicator being generated in a positive state to a second timestamp associated with the device usage indicator being modified to a negative state. Once the device usage indicator is modified to a negative state, the method may go back and monitor the first screen state 305, for example, for a change in state to detect the beginning of a new usage period.

If the second movements are classified as usage movements, the device usage indicator may be maintained in a positive state at process block 350. Once the device usage indicator is maintained in a positive state, the screen state of the mobile device 101 and/or the movements of mobile device 101 may be monitored to determine whether the device usage is continuing and/or when the device usage ends. An updated second screen state 330 may be collected at a third time after the second time, and the method may continue.

In some embodiments, after the device usage indicator is generated in the positive state, but before modifying the device usage indicator the negative state (i.e., while device usage is being detected), a notification may be presented on the mobile device 101 indicative of the positive state of the device usage indicator. The notification may include at least one of an audio alert and/or a haptic alert (e.g., a vibration). In some embodiments, the notification may be presented with increasing magnitude until the device usage indicator is modified to the negative state. For example, the mobile device 101 may beep once every 5 seconds upon initial detection of usage, but increase in frequency to once every half a second if usage continues (and until usage stops). In another example, the mobile device 101 may vibrate at a low strength and for a short period of time upon initial detection of usage, but grow in strength and/or vibrate for a longer periods of time if usage continues (and until usage stops).

Figure 4:
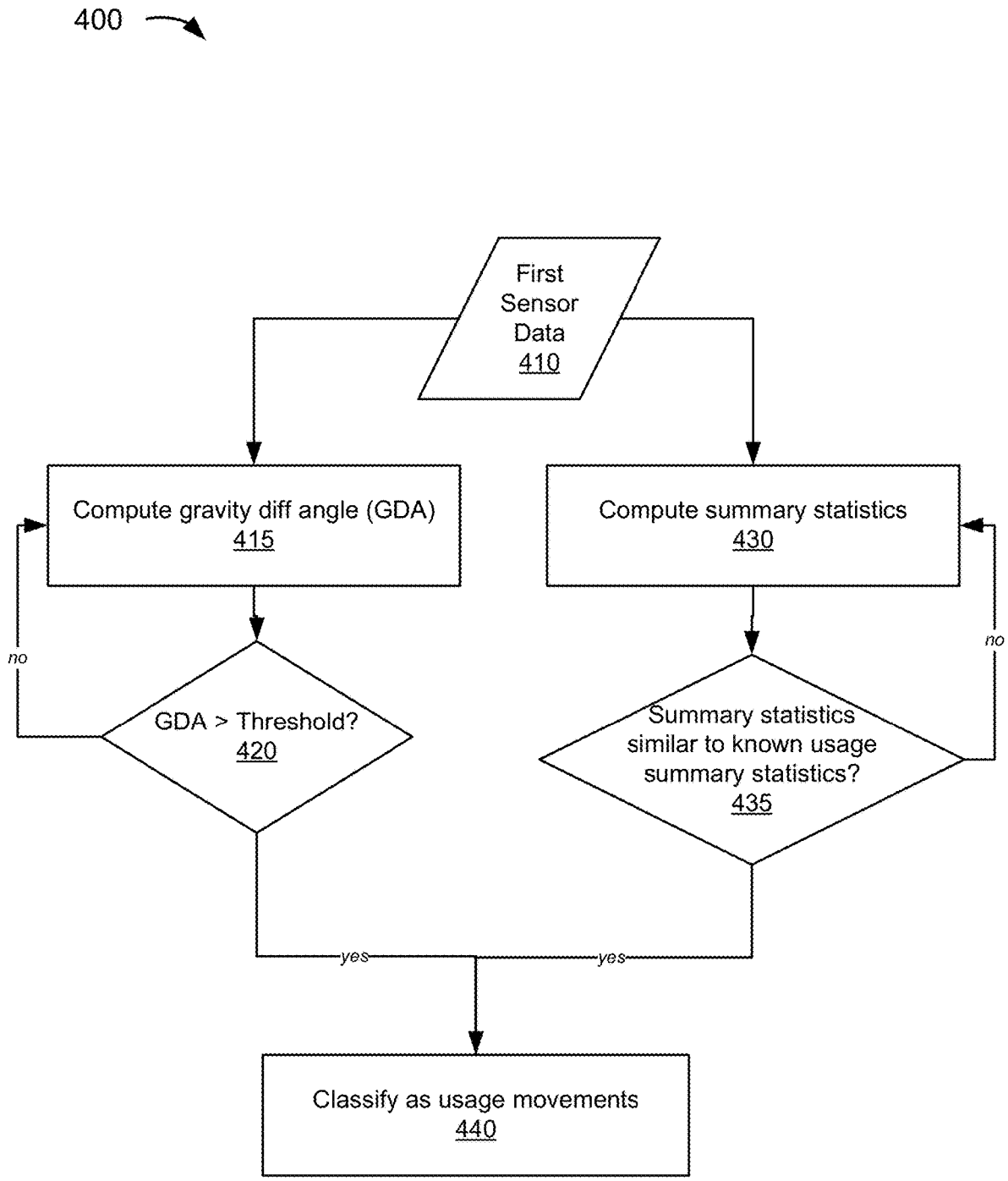
FIG. 4 is a flowchart illustrating a method for classifying initial movements according to some embodiments of the invention.

FIG. 4 is a flowchart 400 illustrating a method for classifying initial movements according to some embodiments of the invention. The method of FIG. 4 may be implemented by decision block 320 of FIG. 3, for example. The method of FIG. 4 may be performed aggregately (e.g., all of process blocks 415-435 are performed to reach process block 440), or separately (e.g., either path of process blocks 415 and 420 or process blocks 430 and 435 may be used to reach process block 440).

According to the path illustrated on the left of FIG. 4, first sensor data 410 is collected. First sensor data 410 may be the same as first sensor data 310 of FIG. 3. First sensor data 410 may include movements of the mobile device 101. At process block 415, a gravity diff angle (GDA) is computed. GDA may be the angular difference between the mobile device 101's gravity vectors per second. GDA may be computed at some time t by taking the angle between the GDA at times t−0.5 and t+0.5. Although described as offsetting the time t by 0.5, it is contemplated that any value may be used to offset time t to calculate GDA.

At decision block 420, it is determined whether the computed GDA is greater than a threshold. In other words, the GDA is monitored for a "spike" corresponding to a user picking up the mobile device 101. In one example, the threshold may be 0.5 rad. If the computed GDA is not greater than the threshold, the GDA for subsequent sets of sensor data 410 may be computed and monitored to determine if or when it exceeds the threshold. If the computed GDA is greater than the threshold, the movements are classified as usage movements at process block 440.

According to the path illustrated on the right of FIG. 4, first sensor data 410 is collected. First sensor data 410 may be the same as first sensor data 310 of FIG. 3. First sensor data 410 may include movements of the mobile device 101. At process block 430, summary statistics may be computed. Exemplary summary statistics may include max, min, mean, med-abs-dev, covariance, percentiles, range, skew, kurtosis, correlation coefficients, zero crossings, entropy, and/or power. At decision block 435, it is determined whether the computed summary statistics are similar to know usage summary statistics. For example, an algorithm may be trained on summary statistics and first sensor data 410 to predict points in time when the user began using the mobile device 101. The algorithm may use examples of non-usage movements (labeled by observing absence of screen-on for an entire trip) and examples of usage movements or device-picked-up movements (labeled by monitoring the screen-on periods). The algorithm may then learn by stochastic gradient descent to distinguish between periods where device usage began and periods where it did not.

If the computed summary statistics are not similar to known usage summary statistics, the summary statistics for subsequent sets of first sensor data 410 may be computed or monitored to determine if or when it is similar to known usage summary statistics. If the computed summary statistics are similar to known usage summary statistics, the movements may be classified as usage movements at process block 440.

Figure 5:
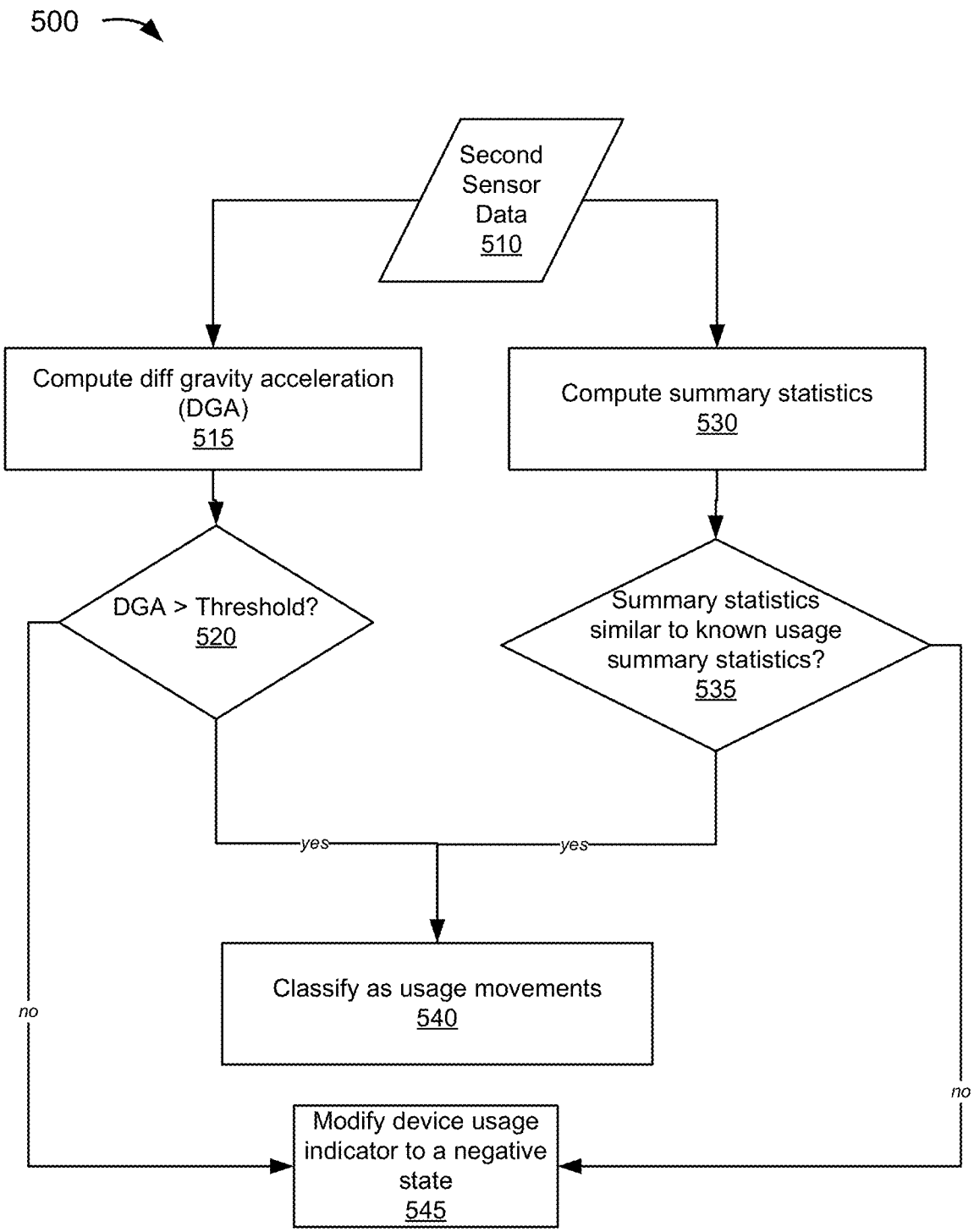
FIG. 5 is a flowchart illustrating a method for classifying ongoing movements according to some embodiments of the invention.

FIG. 5 is a flowchart 500 illustrating a method for classifying ongoing movements according to some embodiments of the invention. The method of FIG. 5 may be implemented by decision block 345 of FIG. 3, for example. The method of FIG. 5 may be performed aggregately (e.g., all of process blocks 515-545 may be performed), or separately (e.g., either path of process blocks 515 and 520 or process blocks 530 and 535 may be used to reach process block 540 or 545).

According to the path illustrated on the left of FIG. 5, second sensor data 510 may be collected. Second sensor data 510 may be the same as second sensor data 335 of FIG. 3. Second sensor data 510 may include movements of the mobile device 101. Second sensor data 510 may be different than first sensor data 410 in that the second sensor data 510 may be collected after the device usage indicator is changed to a positive state (i.e., after usage of mobile device 101 has been detected). At processing block 515, a diff gravity acceleration (DGA) may be computed. DGA may be the norm of the difference between the gravity diff vectors at each timestep. DGA may be computed by taking the derivative (with respect to time) of each component of the gravity vectors to compute the gravity diff vectors, then taking the norm of the derivatives of the gravity diff vectors.

At decision block 520, it is determined whether the computed DGA is greater than a threshold. If the computed DGA over some period drops below the threshold, the device usage indicator is modified to a negative state at process block 545. In other words, it is considered that the user has ended usage of the mobile device 101. If the computed DGA is greater than the threshold, the movements are classified as usage movements at process block 540.

According to the path illustrated on the right of FIG. 5, second sensor data 510 is collected. Second sensor data 510 may be the same as second sensor data 335 of FIG. 3. Second sensor data 510 may include movements of the mobile device 101. Second sensor data 510 may be different than first sensor data 410 in that the second sensor data 510 may be collected after the device usage indicator is changed to a positive state (i.e., after usage of mobile device 101 has been detected).

At process block 530, summary statistics may be computed. Exemplary summary statistics may include max, min, mean, med-abs-dev, covariance, percentiles, range, skew, kurtosis, correlation coefficients, zero crossings, entropy, and/or power. At decision block 535, it is determined whether the computed summary statistics are similar to know usage summary statistics. For example, an algorithm may be trained on summary statistics and second sensor data 510 to predict points in time when the user was using the mobile device 101 (as opposed to the algorithm of FIG. 4, which is trained to predict points in time when the user began using the mobile device 101). The algorithm may use examples of non-usage movements (labeled by observing the absence of screen-on for an entire trip) and examples of usage movements or device-picked-up movements (labeled by monitoring periods where the user was using an application or typing on the screen). The algorithm may then learn by stochastic gradient descent to distinguish between periods where usage of mobile device 101 were occurring and periods where it was not.

If the computed summary statistics are not similar to known usage summary statistics, the device usage indicator may be modified to a negative state at process block 545. If the computed summary statistics are similar to known usage summary statistics, the movements may be classified as usage movements at process block 540.

Figure 6:
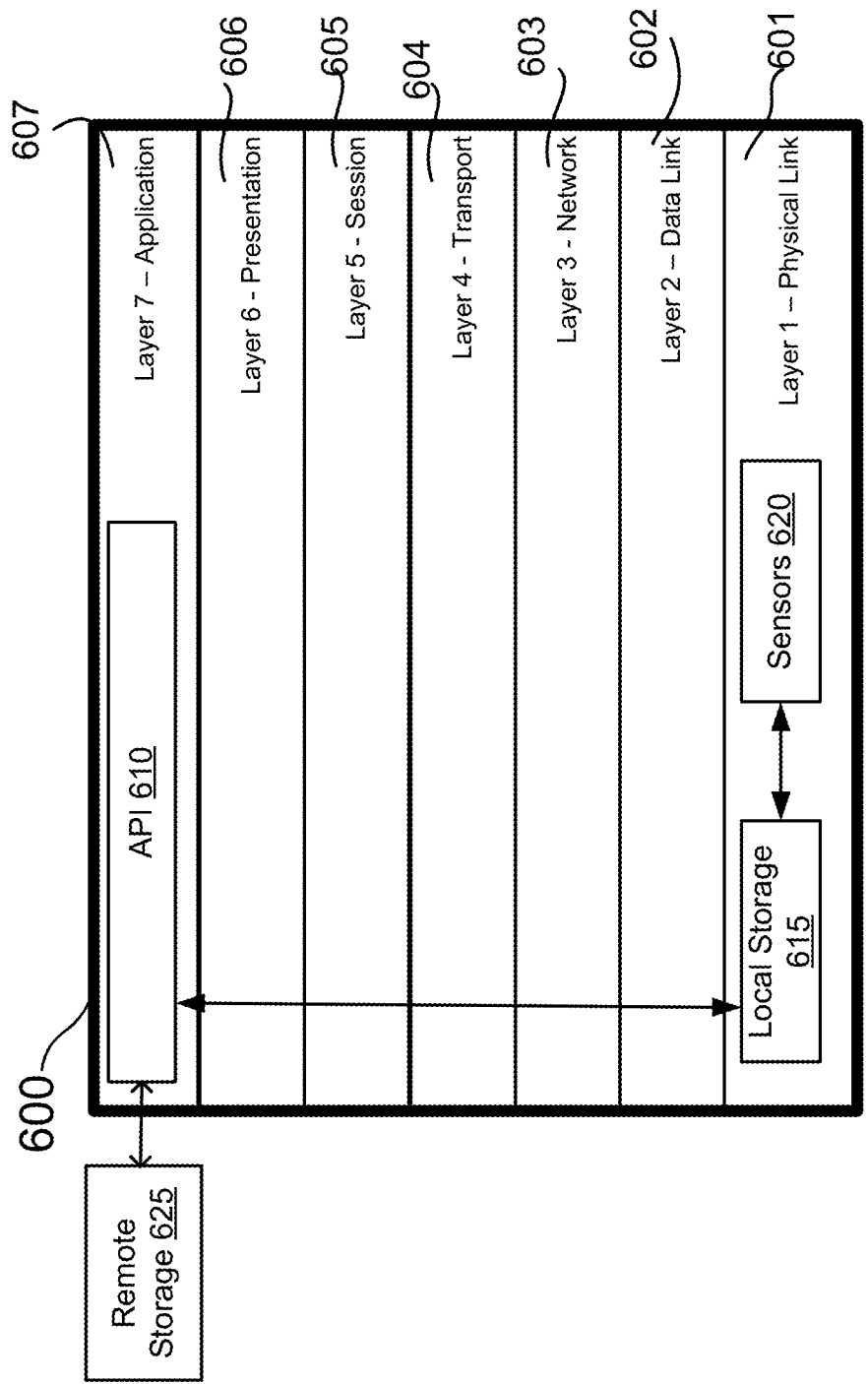
FIG. 6 is a block diagram of a protocol stack that may be implemented on a mobile device to perform device usage detection methods according to some embodiments of the invention.

FIG. 6 is a block diagram of a protocol stack 600 that may be implemented on a mobile device 101 to perform the device usage detection methods described herein according to some embodiments of the invention. The mobile device 101 may implement the protocol stack 600 to communicate with any of the other systems described herein. The protocol stack 600 may include one or more of seven layers: an application layer 607, a presentation layer 606, a session layer 605, a transport layer 604, a network layer 603, a data link layer 602, and/or a physical link layer 601. Together, these seven layers may represent a model, such as an Open Systems Interconnection (OSI) model. The OSI model of FIG. 6 may characterize the communication functions of the described systems. Although shown and described as having seven layers, it is contemplated that the protocol stack 600 may include more or fewer layers to perform less, the same, or additional functions.

According to the OSI model, the application layer 607 may interact with a user (e.g., via receiving user inputs and presenting outputs) and software applications implementing a communication component. The application layer 607 may synchronize communication between systems and determine resource availability. The application layer 607 may be application-specific, in that the specific functions dependent on the particular application being executed by the computing device.

For example, the application layer 607 may execute an application programming interface (API) 610 which in turn may execute the processes (e.g., of flowcharts 300, 400, and/or 500) of the disclosure. API 610 may be executed entirely at the application layer 607. API 610 may allow the mobile device 101 to query an operating system for a screen state and receive screen state data. API 610 may further generate device usage indicators in positive or negative states. API 610 may further receive movements of the device stored in remote storage 625 and/or local storage 615, as generated by the sensors 620. Remote storage 625 may be the same as storage 156 of FIG. 1 and/or storage 256 of FIG. 2.

The presentation layer 606 may translate between application and network formats. Various applications and networks may implement different syntaxes and semantics. Thus, the presentation layer 606 may transform data from the network into a form that the application accepts. The presentation layer 606 may also format and encrypt data from the application to be sent on a network.

The session layer 605 may control connections between the systems and other devices and/or servers, as described herein. The session layer 605 may establish the connections, manage the connections, and terminate the connections used to communicate between the devices.

The transport layer 604 may provide techniques for performing quality of service functions during transfers of data between devices. The transport layer 604 may provide error control. For example, the transport layer 404 may keep track of data being transmitted and transmit any communications that fail. In addition, the transport layer 604 may provide an acknowledgment of successful data transmission and send the next data to be transmitted in a synchronous fashion if no errors occurred.

The network layer 603 may provide the means of transferring the data to and from the systems over a network. The source node and destination node of the systems may each have an address which permits the other to transfer data to it by providing the address with the data. The network layer 603 may also perform routing functions that allow it to a determine a path between the source node and destination node, possibly through other nodes.

The data link layer 602 may define and provide the link between a directly and physically connected source node and destination node. The data link layer 602 may further detect and correct errors occurring at the physical link layer 601. In some embodiments, the data link layer 602 may include two sublayers: a media access control (MAC) layer that may control how devices in the network gain access to data and gain permission to transmit it, and a logical link control (LLC) layer that may identify network layer 603 protocols and encapsulate them.

The physical link layer 601 may include local storage 615 and sensors 620. The local storage 615 may, for example, cache raw sensor data and/or movements of mobile device 101 as collected by the sensors 620, as described further herein. Local storage 615 may the same as storage 126 of FIG. 1. Sensors 620 may be the same as one or more of the sensors of sensor data block 105 of FIG. 1. The physical link layer 601 may define the electrical and physical specifications of the data. The physical link layer 601 may provide a physical medium for storing unstructured raw data to be transmitted and received.

Figure 7:
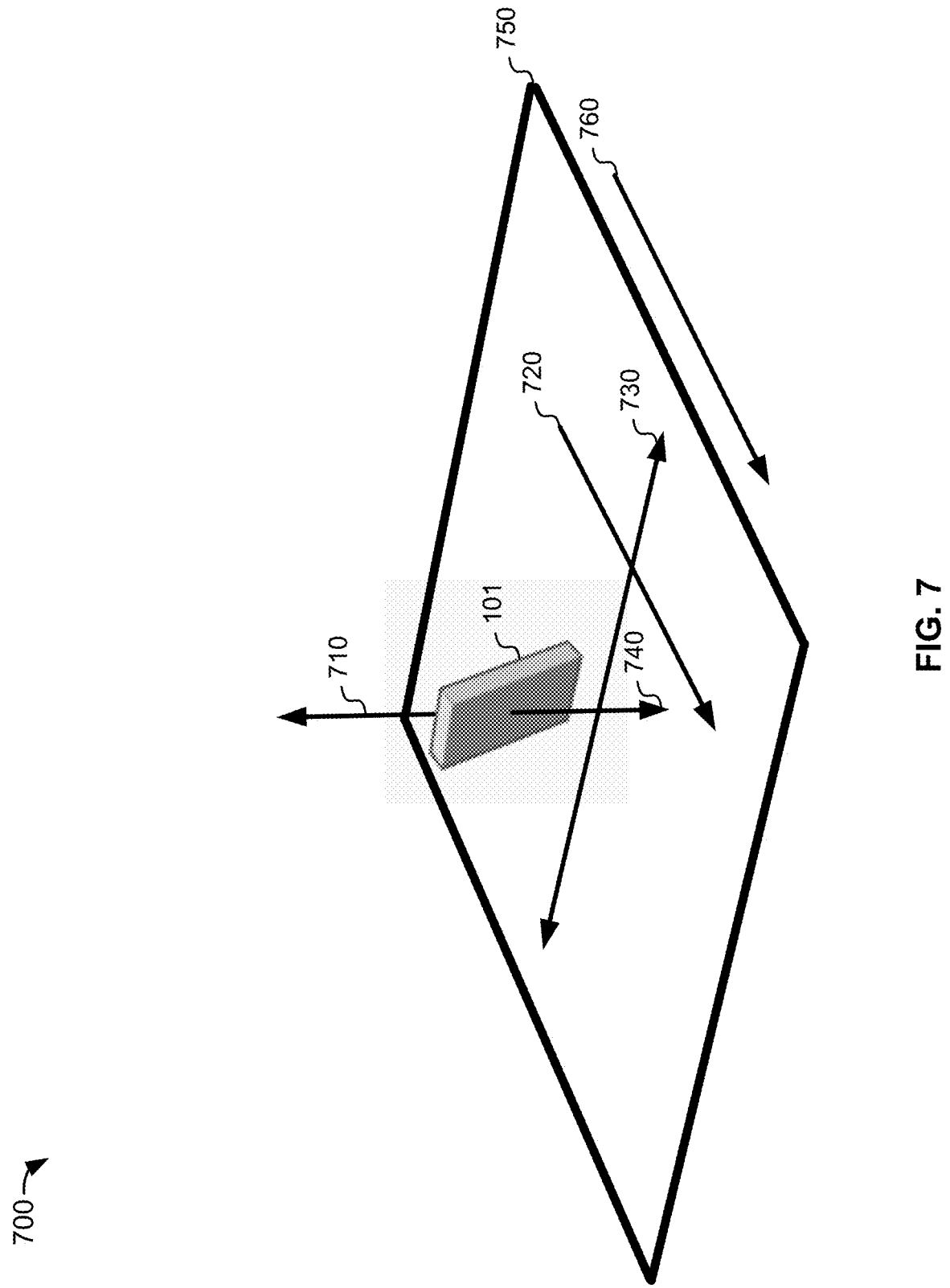
FIG. 7 is a simplified diagram of a mobile device in a vehicle according to some embodiments of the invention.

FIG. 7 is a simplified diagram of a mobile device 101 in a vehicle 750, according to an embodiment. FIGS. 7-13 provide examples of different types of processes, used by some embodiments, to collect and analyze movement measurements from mobile device 101. FIG. 7 depicts a vehicle 750 having a driver (not shown) where mobile device 101 is used to provide movement measurements that enable estimates of driving behavior.

In some embodiments, as described in U.S. patent application Ser. No. 15/149,603, filed May 9, 2016 (herein incorporated by reference in its entirety), using an extended Kalman filter applied to movement data from mobile device sensors, a gravity vector (e.g., gravity vector 740) for a mobile device (e.g., mobile device 101) in a moving vehicle (e.g., vehicle 750) moving in the direction indicated by reference numeral 760. Generally speaking, in a moving vehicle, the determined gravity vector of the mobile device as a function of time is always changing.

To determine a change in the orientation of mobile device 101 relative to vehicle 750, some embodiments analyze two gravity vectors associated with a time point (t), for example, gravity vectors G(t) before and after the time point (e.g., at t−15 seconds and t+15 seconds). By comparing these gravity vectors over a time interval, a difference in gravity angle (e.g., measured in radians), and gravity magnitude can be determined 740 (respectively termed herein, gravity angle difference and gravity magnitude difference). It should be appreciated that a larger or smaller interval can also be used. It is also important to note that, while embodiments described herein are described as operating on stored data (i.e., after the drive has completed, not in real time), the components, principles and approaches described herein could also operate in substantially real-time (e.g., using a t−30 and t−15 interval for example to analyze gravity vectors, or other suitable approach).

In some embodiments, whether the mobile device remained stationary within the vehicle during a time interval can be estimated by comparing the determined gravity angle difference, and the determined gravity magnitude difference to one or more thresholds. In an example of this threshold comparison, having a gravity angle difference above one (1) radian and a gravity magnitude difference above one (1) g indicate to an embodiment that the mobile device likely moved relative to the vehicle at time point (t). It would be appreciated by one having skill in the relevant art(s), given the description herein, that different combinations of threshold values could be used, e.g., different gravity magnitude differences, different gravity angle differences, and/or requiring multiple consecutive differences over thresholds before a change in orientation is estimated.

Figure 8:
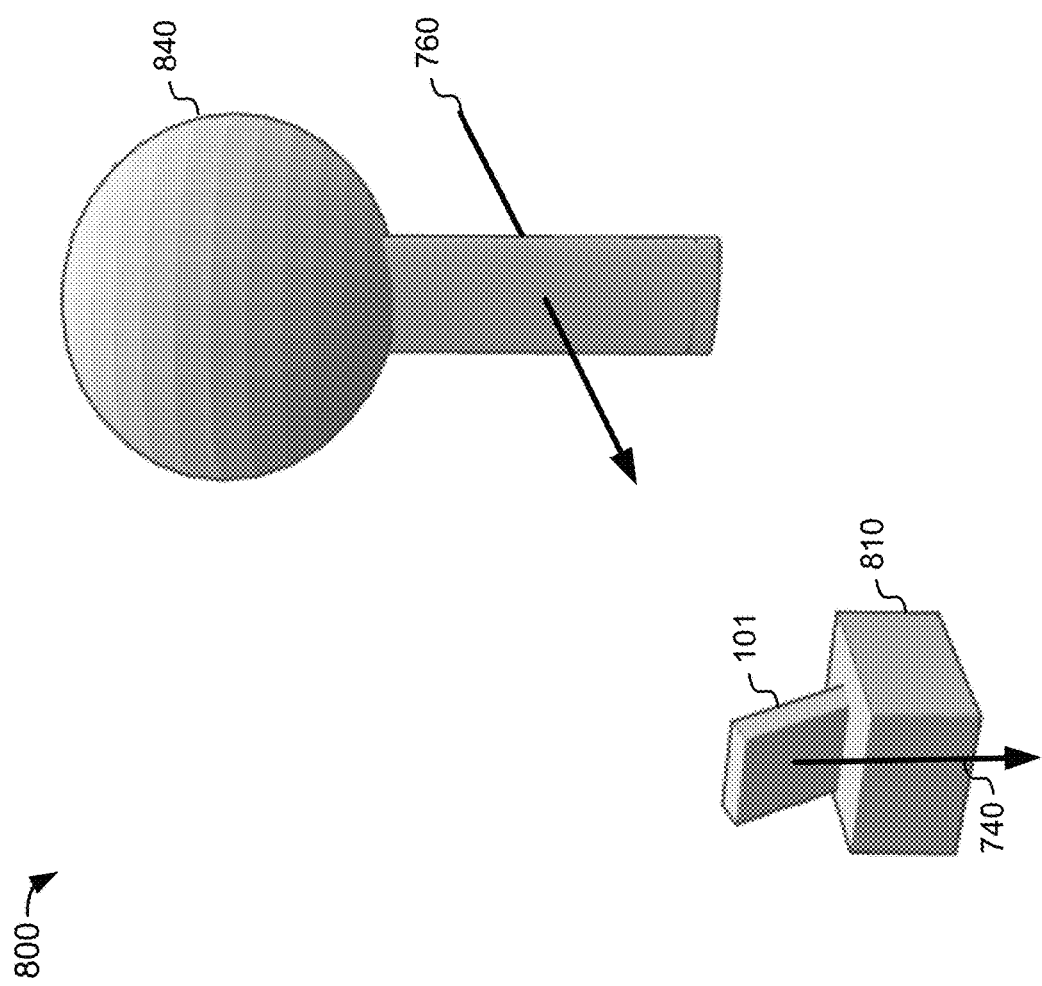
FIG. 8 is a simplified diagram of a driver and a mobile device in a vehicle according to some embodiments of the invention.

FIG. 8 is a simplified diagram of a driver 840 and a mobile device 101 in a vehicle, according to an embodiment. Mobile device 101 is in a cup holder 810. Vector 760 shows the direction of the vehicle relative to driver 840. Gravity vector 740 shows that mobile device 101 is angled backwards in cup holder 810. For some embodiments, this is the starting point of the drive, e.g., mobile device is placed in cup holder 810, the drive begins, and any movement of 810 relative to vehicle 750 is detected and measured for distraction potential. Other example starting positions include, but are not limited to: mounted in a mobile device holder attached to a windshield, rear view mirror, dashboard or other similar vehicle surface, placed on a seat, in a clothes pocket. It is important to note that, some embodiments do not need any indication of where mobile device 101 is placed within a vehicle in order to perform the movement measurement analysis described herein.

Figure 9:
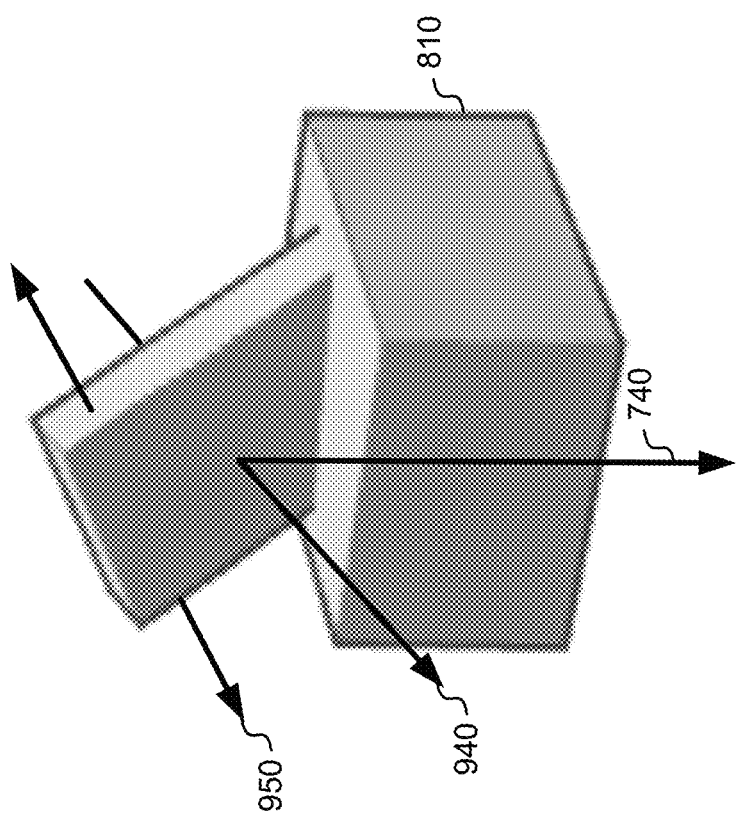
FIG. 9 is a simplified diagram of a mobile device in a cup holder in a vehicle according to some embodiments of the invention.

FIG. 9 is a simplified diagram of a mobile device in a cup holder in a vehicle, according to an embodiment. Differing from the placement of mobile device 101 in the cup holder of FIG. 8, angle 950 shows that mobile device 101 is angled to the left (to the driver's right) in the cup holder. It is important to note that, some embodiments to not need any particular orientation of mobile device 101 to be able to collect useful movement measurements for embodiments.

Vector 940 illustrates a direction perpendicular to the back (and front) of mobile device 101. As discussed with the description of FIGS. 12 and 13 below, this vector 940 is used by some embodiments to estimate whether a person is interacting with the mobile device, e.g., typing on a keyboard.

Figure 10:
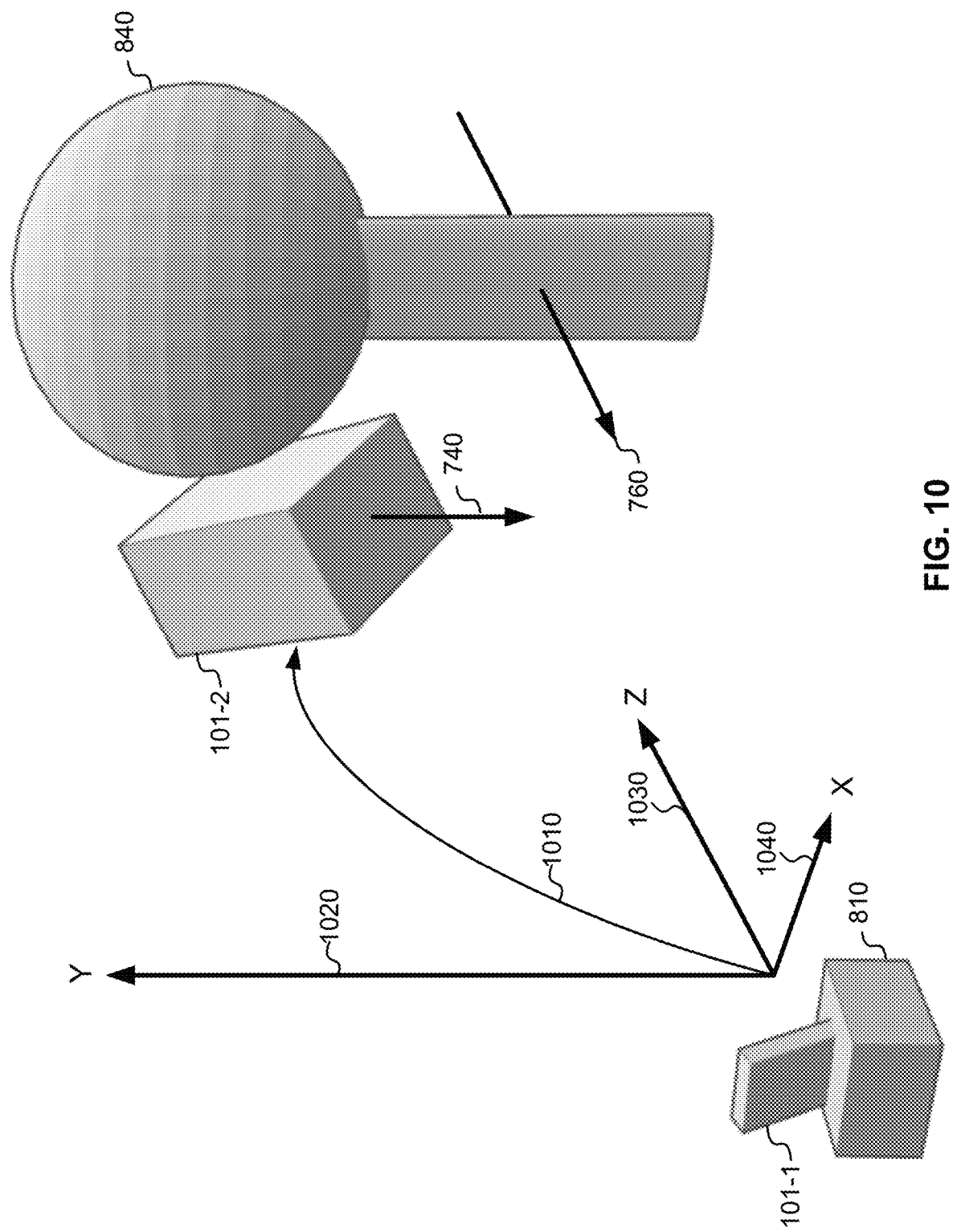
FIG. 10 is a simplified diagram of a driver, a mobile device and accelerometer data according to some embodiments of the invention.

FIG. 10 is a simplified diagram of a driver, a mobile device and accelerometer data, according to an embodiment. When sitting in cup holder 810, mobile device 101 is generally not moving relative to the vehicle. Even if mobile device 101 moves around within cup holder 810, this movement can be subject to a threshold that would be exceeded before triggering further analysis.

In contrast to a minor movement example (e.g., sliding around in cup holder 810), FIG. 10 shows an example of a move of mobile device 101 that could trigger analysis by some embodiments. In this example, driver 840 takes mobile device 101-1 in hand (hand not shown), lifts it up, toward him, and to the right. This movement can be detected and analyzed by accelerometer 112 and gyroscope 138. The measurements collected from this accelerometer 112, as mobile device 101 moves along track 1010, are shown in relation to axis X 1040, Y 1020 and Z 1030. In some embodiments, the movement shown in FIG. 10 is sufficient to trigger further analysis for distraction potential, e.g., mobile device 101 was mounted, now it's moving. Some embodiments assess that this could be because the driver is holding the device and typing on the screen, or making a phone call without a headset.

After mobile device 101 stops moving (e.g., from 101-1 position to 101-2 position) the change in orientation is measured. In this example, after the orientation measurement, mobile device 101-2 position is depicted in FIG. 10. As shown in FIG. 10, mobile device 101 is angled in such a way that it could be used as a telephone, without use of a hands free device. Based on the orientation of mobile device 101-2, in some embodiments, the estimated activity is that driver 840 is holding mobile device 101 to her ear, and thus making a phone call without use of a headset.

It is worth noting the processes, used by some embodiments, to differentiate between used of mobile device 101 by the driver of a vehicle and non-drivers, e.g., passengers in either the front of the vehicle with the driver or in rearward seats. Using the example from FIG. 10: In this example, mobile device 101-2 is determined to be pointing at driver 840, and thus some embodiments would estimate mobile device 101-2 was being used by the driver. Similarly, in a different example, mobile device 101 can be facing the passenger's seat, or rear seats (with accompanying accelerometer data suggesting a movement along the Z 1030 axis to the back seats). In this different example, driver 840 would not be estimated by some embodiments to be distracted by this movement.

Figure 11:
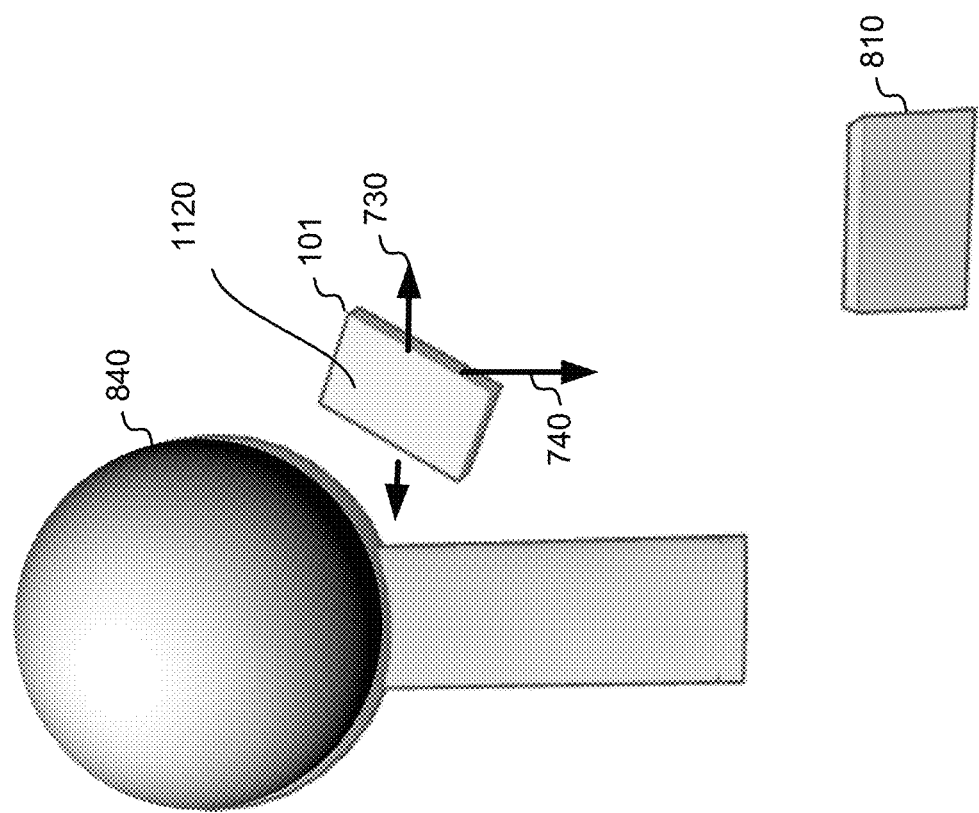
FIG. 11 is a simplified diagram of a driver and a mobile device held up toward the driver for screen viewing according to some embodiments of the invention.

FIG. 11 is a simplified diagram of a driver, and a mobile device held up toward the driver for screen viewing, according to an embodiment. As another example of measuring movement and estimating activity, FIG. 11 shows a view of driver 840 from the back, and mobile device 101. In this example, it can be seen that mobile device 101 also undergoes a significant (yet shorter than the move discussed with FIG. 10) move from cup holder 810, to a position where screen 1120 is facing driver 540. As with FIG. 10, in some embodiments, this move can trigger further analysis of the position of mobile device 101. It is worth noting that, this analysis first of movement, then of position can, in some embodiments, improve the efficiency of the process (e.g., by reducing the amount of movement measurements that are collected and stored for later analysis or by reducing real-time analysis of movement measurements). It is also important to note that, different types of measurement collection and analysis can be performed sequentially, simultaneously and/or combinations of the two approaches.

Figure 12:
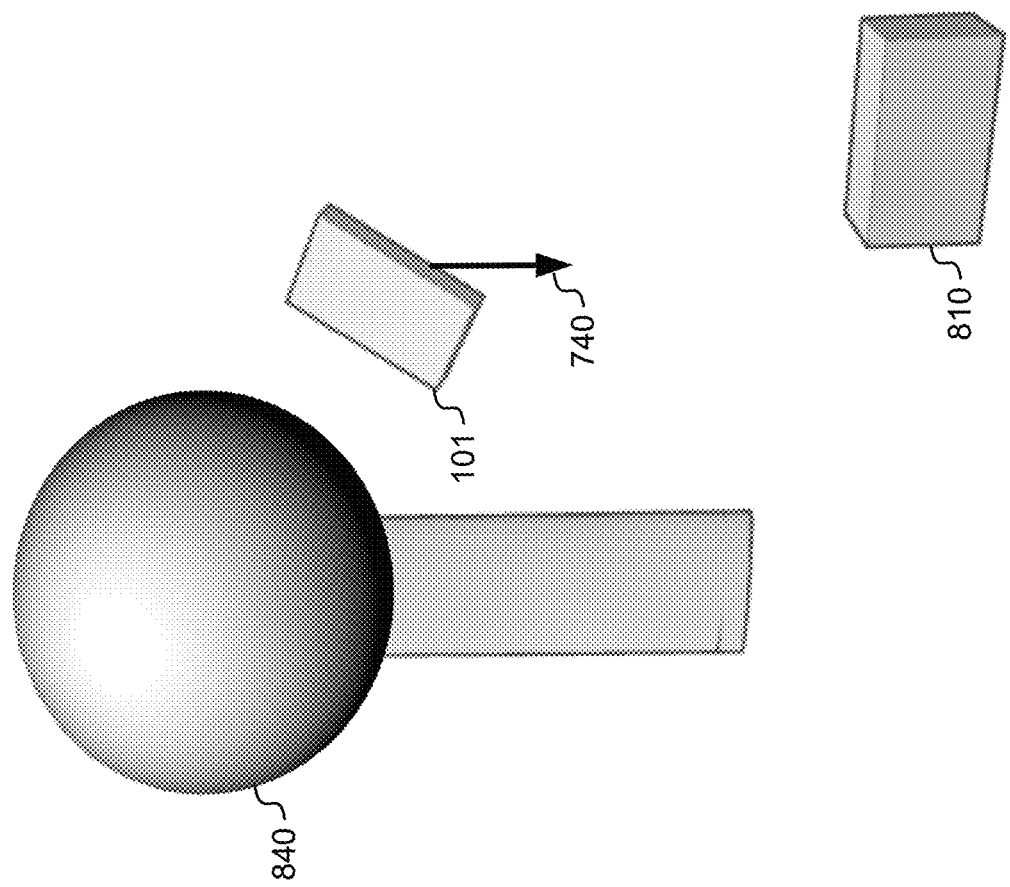
FIG. 12 is a simplified diagram of a driver and a mobile device held up toward the driver for viewing and touch interface interaction according to some embodiments of the invention.

FIG. 12 is a simplified diagram of a driver, and a mobile device held up toward the driver for viewing and touch interface interaction, according to an embodiment. This view (from the right side of driver 840) shows another view of a mobile device 101 orientation where mobile device 101 is positioned in a way that, in some embodiments, is assessed to be indicative of a reading or typing action being performed by driver 840. One having skill in the relevant art(s), given the description herein, will appreciate that some embodiments can be configured to detect different orientations of mobile device 101, and analyze these orientations to estimate other types of activities of driver 840.

In some embodiments, movement and orientation of mobile device 101 that is similar to the examples of FIGS.

11 and 12, signal a likelihood that, in addition to viewing screen 1120, driver 840 may be interacting with interface elements of mobile device 101 (termed herein as "interactions" or "touches"). As will be appreciated by one having skill in the relevant art(s), interactions (e.g., touching a user interface, typing on a user interface or hardware keyboard, swiping, tapping, and or other input events), can be a distracting activity for driver 840. Some embodiments use different approaches to determine whether different interactions are occurring.

FIG. 13 is another simplified diagram of a driver, and a mobile device held up toward the driver potentially for viewing and touch interface interaction, according to an embodiment. Vector 940, introduced above in an example where mobile device 101 was still in cup holder 810, is used by some embodiments to detect interactions with driver 840. For example, when a keyboard (software or hardware) is repeatedly tapped by driver 840, it can cause a frequency vibration towards vector 940 in some degree (e.g., detectable by movement sensors, such as accelerometer 112 and gyroscope 116) (termed herein "device touch movements").

In another example, detecting a single tap, then a tilting movement in a particular direction can indicate a swiping gesture to some embodiments. It should be noted that, rather than using indications from the operating system of mobile device 101 to determine whether specific application activities (e.g., texting, social media posting, scrolling of content), some embodiments use device sensors to detect the underlying (potentially distracting) elements of these specific activities.

One having skill in the relevant art(s), given the description herein, will appreciate that the detection of different interactions or touches can be measured, tuned and customized for individual users, or can also be tuned for generic users. In some embodiments, it is a combination of the processes discussed herein (e.g., movement to an orientation, the orientation, and the detected device touch movements) that lead to the estimates of different activities.

Also, in some embodiments, individual processes described herein can lead to estimates. For example, if device usage movements are detected in mobile device 101 while mobile device 101 is stationary in vehicle 750 (e.g., as with the example discussed with FIG. 8 where mobile device 101 is in cup holder 810, or mounted on the vehicle dashboard), the device usage movements can be such that some embodiments estimate that interaction is occurring with mobile device 101 by driver 840 (e.g., device touch movements).

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for determining usage of a mobile device in a vehicle by a user, the method comprising:
   receiving, by a processor of the mobile device, a first value indicating an "off" state of a screen of the mobile device at a first time;
   operating, by the processor and in response to receiving the first value, at least one sensor of the mobile device to obtain first movement measurements corresponding to first movements of the mobile device;
   computing, by the processor using the first movement measurements, a gravity diff angle (GDA) value for the first movements;
   determining, by the processor, that the GDA value exceeds a predefined GDA threshold value;
   computing, by the processor using the first movement measurements, summary statistics for the first movements;
   classifying, by the processor using known statistics indicative of the user initiating mobile device usage, the summary statistics as corresponding to mobile device usage starting;
   classifying, by the processor, the first movements of the mobile device as usage movements in response to determining that the GDA value exceeds the predefined GDA threshold, classifying the summary statistics as corresponding to mobile device usage starting, or both; and
   generating, by the processor, an indication of mobile device usage in response to classifying the first movements of the mobile device as usage movements.

2. The method of claim 1, further comprising:
   receiving, by the processor, a second value indicating an "on" state of the screen of the mobile device at a second time;
   operating, by the processor and in response to receiving the second value, the at least one sensor of the mobile device to obtain second movement measurements corresponding to second movements of the mobile device;
   classifying, by the processor, the second movements of the mobile device as usage movements or non-usage movements based on characteristics of the second movements; and
   maintaining the indication of mobile device usage in response to the second movements of the mobile device being classified as usage movements or changing the indication of mobile device usage to an indication of mobile device non-usage in response to the second movements of the mobile device being classified as non-usage movements.

3. The method of claim 1, wherein the known statistics indicative of the user initiating mobile device usage are computed from stored usage movements from the mobile device.

4. The method of claim 1, further comprising presenting at least one of an audio alert or a haptic alert as a warning notification of mobile device usage in response to the indication of mobile device usage being generated.

5. The method of claim 4, wherein the warning notification is presented with increasing magnitude until the indication of mobile device usage is changed to an indication of mobile device non-usage.

6. The method of claim 1, wherein the at least one sensor comprises at least one of an accelerometer, a gyroscope, a global positioning system (GPS), or a magnetometer.

7. A method for determining usage of a mobile device in a vehicle by a user, the method comprising:
   receiving, by a processor of the mobile device, a first value indicating an "on" state of a screen of the mobile device at a first time;
   generating, by the processor and in response to receiving the first value, an indication of mobile device usage based on the first value;
   receiving, by the processor, a second value indicating an "on" state of the screen of the mobile device at a second time;
   operating, by the processor and in response to receiving the second value, at least one sensor of the mobile device to obtain movement measurements corresponding to movements of the mobile device;
   computing, by the processor using the movement measurements, a diff gravity acceleration (DGA) value for the movements;
   determining, by the processor, that the DGA value does not exceed a predefined DGA threshold value;
   computing, by the processor using the movement measurements, summary statistics for the movements;
   classifying, by the processor using known statistics corresponding to periods of mobile device usage, the summary statistics as not corresponding to mobile device usage;
   classifying, by the processor, the movements of the mobile device as non-usage movements in response to determining that the DGA value does not exceed the predefined DGA threshold value, classifying the summary statistics as not corresponding to mobile device usage, or both; and
   changing the indication of mobile device usage to an indication of mobile device non-usage in response to the movements of the mobile device being classified as non-usage movements.

8. The method of claim 7, wherein the known statistics indicative of the user initiating mobile device usage are computed from stored usage movements from the mobile device.

9. The method of claim 7, further comprising calculating a period of mobile device usage based on a first timestamp associated with generating the indication of mobile device usage based on the first value and a second timestamp associated with changing the indication of mobile device usage to the indication of mobile device non-usage.

10. The method of claim 7, further comprising presenting at least one of an audio alert or a haptic alert as a warning notification of mobile device usage in response to the indication of mobile device usage being generated.

11. The method of claim 10, wherein the warning notification is presented with increasing magnitude until the indication of mobile device usage is changed to the indication of mobile device non-usage.

12. The method of claim 7, wherein the at least one sensor comprises at least one of an accelerometer, a gyroscope, a global positioning system (GPS), or a magnetometer.

13. A mobile device comprising:
   at least one sensor configured to measure mobile device movements; and
   a processor coupled to the at least one sensor, wherein the processor is configured to perform operations including:
      receiving a first value a first value indicating an "off" state of a screen of the mobile device at a first time;
      in response to receiving the first value, operating the at least one sensor to obtain first movement measurements corresponding to first movements of the mobile device;
      computing, using the first movement measurements, summary statistics for the first movements;
      classifying, using known statistics indicative of users initiating mobile device usage, the summary statistics as corresponding to mobile device usage starting;
      classifying the first movements of the mobile device as usage movements in response to classifying the summary statistics as corresponding to mobile device usage starting;
      in response to classifying the first movements of the mobile device as usage movements, generating an indication of mobile device usage;
      receiving a second value indicating an "on" state of the screen of the mobile device at a second time;
      in response to receiving the second value, operating the at least one sensor to obtain second movement measurements corresponding to second movements of the mobile device;
      computing, by the processor using the second movement measurements, second summary statistics for the second movements;
      classifying, using known statistics corresponding to periods of mobile device usage, the second summary statistics as corresponding to mobile device usage or mobile device non-usage;
      classifying the second movements of the mobile device as usage movements or non-usage movements based on classifying the second summary statistics as corresponding to mobile device usage or mobile device non-usage;
      in response to classifying the second movements of the mobile device as non-usage movements, changing the indication of mobile device usage to an indication of mobile device non-usage; and
      in response to classifying the second movements of the mobile device as usage movements, maintaining the indication of mobile device usage.

14. The mobile device of claim 13, wherein either the known statistics indicative of users initiating mobile device usage, the known statistics corresponding to periods of mobile device usage, or both, are computed from stored usage movements from the mobile device.

15. The mobile device of claim 13, wherein a period of mobile device usage is calculated based on a first timestamp associated with generating the indication of mobile device usage based on the first value and a second timestamp associated with changing the indication of mobile device usage to the indication of mobile device non-usage.

16. The mobile device of claim 13, wherein the processor is further configured to perform operations including presenting at least one of an audio alert or a haptic alert as a warning notification of mobile device usage in response to the indication of mobile device usage being generated.

17. The mobile device of claim 16, wherein the warning notification is presented with increasing magnitude until the indication of mobile device usage is changed to the indication of mobile device non-usage.

18. The mobile device of claim 13, wherein the at least one sensor comprises at least one of an accelerometer, a gyroscope, a global positioning system (GPS), or a magnetometer.

* * * * *